(12) United States Patent
Sollenberger et al.

(10) Patent No.: US 8,644,286 B2
(45) Date of Patent: Feb. 4, 2014

(54) METHOD AND SYSTEM FOR FAST CELL SEARCH USING PSYNC PROCESS IN A MULTIMODE WCDMA TERMINAL

(75) Inventors: Nelson Ray Sollenberger, Farmingdale, NJ (US); Xiaoxin Qiu, Bridgewater, NJ (US); Wei Luo, Marlboro, NJ (US)

(73) Assignee: Broadcom Corporation, Irvine, CA (US)

( * ) Notice: Subject to any disclaimer, the term of this patent is extended or adjusted under 35 U.S.C. 154(b) by 1828 days.

(21) Appl. No.: 11/353,369

(22) Filed: Feb. 14, 2006

(65) Prior Publication Data

US 2007/0189259 A1 Aug. 16, 2007

(51) Int. Cl.
*H04B 7/216* (2006.01)
*H04B 7/00* (2006.01)

(52) U.S. Cl.
USPC .......................... 370/342; 370/329; 455/525

(58) Field of Classification Search
USPC ................ 455/434, 450–453, 502, 511–517, 455/524–525; 370/328–350
See application file for complete search history.

(56) References Cited

U.S. PATENT DOCUMENTS

| | | | | |
|---|---|---|---|---|
| 5,199,031 | A * | 3/1993 | Dahlin | 370/329 |
| 5,260,943 | A * | 11/1993 | Comroe et al. | 370/332 |
| 5,537,434 | A * | 7/1996 | Persson et al. | 375/134 |
| 5,542,097 | A * | 7/1996 | Ward et al. | 455/437 |
| 5,732,352 | A * | 3/1998 | Gutowski et al. | 455/437 |
| 6,157,631 | A * | 12/2000 | Rohani | 370/342 |
| 2004/0043769 | A1 * | 3/2004 | Amerga et al. | 455/437 |
| 2004/0203839 | A1 * | 10/2004 | Ostberg et al. | 455/455 |
| 2005/0054368 | A1 * | 3/2005 | Amerga | 455/525 |
| 2007/0064642 | A1 * | 3/2007 | Watabe et al. | 370/324 |
| 2008/0207196 | A1 * | 8/2008 | Pettersson | 455/424 |

OTHER PUBLICATIONS

3rd Generation Partnership Project; Technical Specification Group GSM/EDGE Radio Access Network; Radio Subsystem Link Control (Release 1999), 3GPP TS 05.08 V8.23.0 (Nov. 2005), pp. 1-100.

* cited by examiner

*Primary Examiner* — Erika A Washington
(74) *Attorney, Agent, or Firm* — Sterne, Kessler, Goldstein & Fox PLLC

(57) ABSTRACT

Certain aspects of a method and system for a fast cell search using a primary synchronization channel (PSYNC) process in a multimode wideband code division multiple access (WCDMA) terminal are provided. A WCDMA frequency search or a global system for mobile communications (GSM) frequency search is performed based on a current radio access technology (RAT), received signal strength indication (RSSI) scan measurements, and PSYNC detection operations. The RSSI scan measurements may be averaged by making multiple measurements during a measurement period. At least part of the PSYNC detection operations may be performed during a remaining portion of the measurement period. WCDMA carrier frequencies may be marked in accordance with the results of the PSYNC detection operations. For GSM, some of the frequencies may be removed from the search based on the PSYNC marking while the remaining search frequencies may be ranked based on results from the RSSI scan measurements.

21 Claims, 7 Drawing Sheets

METHOD AND SYSTEM FOR FAST CELL SEARCH USING PSYNC PROCESS IN A MULTIMODE WCDMA TERMINAL

CROSS-REFERENCE TO RELATED APPLICATIONS/INCORPORATION BY REFERENCE

This application makes reference to U.S. application Ser. No. 11/354,704 Feb. 14, 2006.

The above stated application is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of signals in wireless systems. More specifically, certain embodiments of the invention relate to a method and system for a fast cell search using a PSYNC process in a multimode WCDMA terminal.

BACKGROUND OF THE INVENTION

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. The evolution of third generation, or "3G" radio access technology (RAT) introduces fully packet-switched networks, which supports high-speed data communications.

The general packet radio service (GPRS), which is an example of a 2.5G network service oriented for data communications, comprises enhancements to GSM which required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates which may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (WCDMA) to support data transfer rates, which may be as high as 2 Mbits/s. One reason why WCDMA may support higher data rates is that WCDMA channels may have a bandwidth of 5 MHz versus the 200 kHz channel bandwidth in GSM. So each WCDMA channel may support the equivalent of 25 GSM channels. A related 3G technology, high speed downlink packet access (HSDPA), is an Internet protocol (IP) based service oriented for data communications, which adapts WCDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

In existing devices such as cellular telephones that utilize multimode radios, startup procedures when searching for available frequencies may take quite a bit of time. This may be due to several reasons. For example, the search procedure for one mode may be wholly independent, and thus decoupled, from other search modes, thereby resulting in serial searches. The serial searches require that searching for frequencies in one mode be completed before searching for frequencies in another mode is initiated.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a fast cell search using a PSYNC process in a multimode WCDMA terminal, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
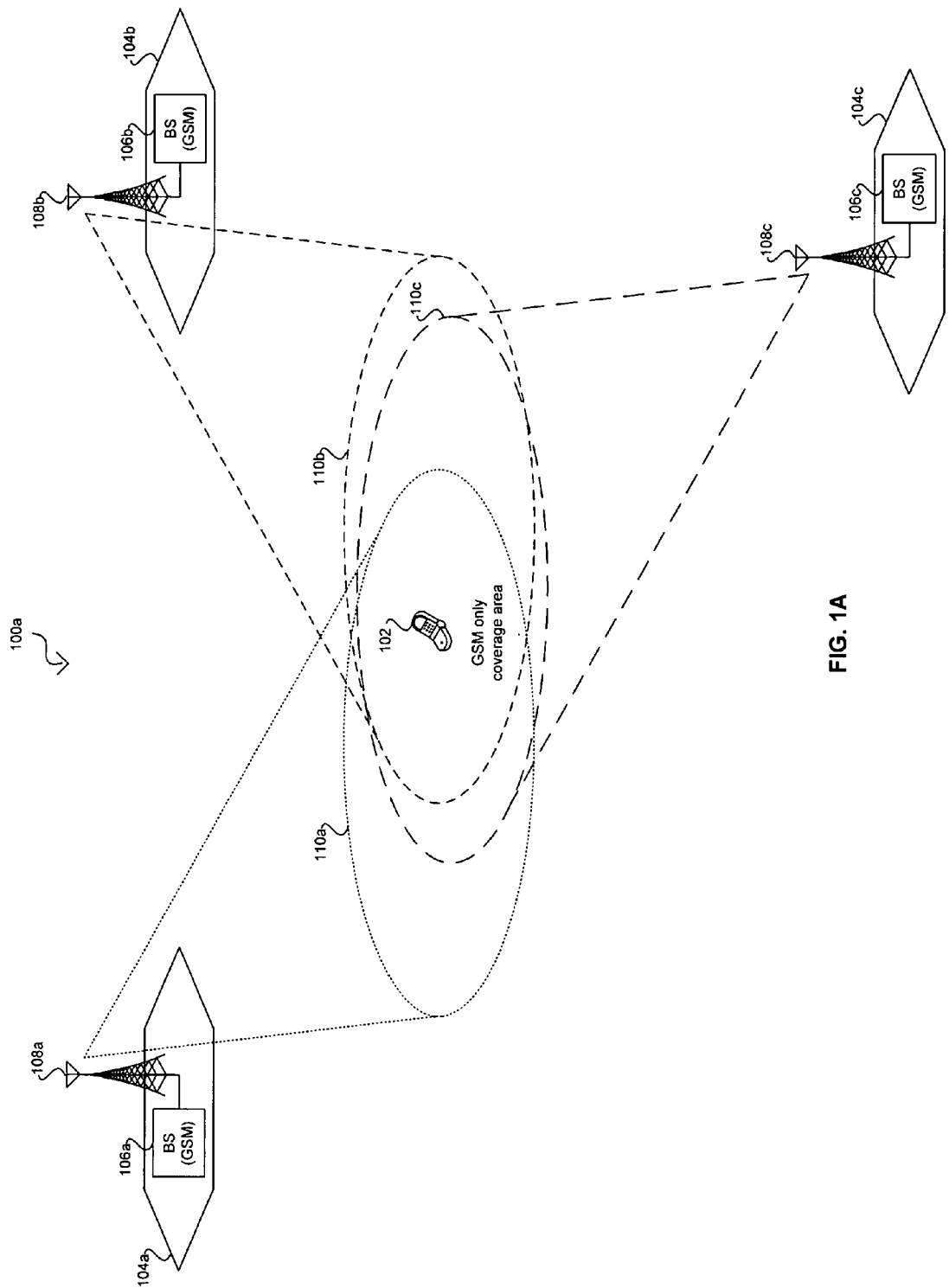
FIG. 1A is a diagram illustrating an exemplary multi-RAT mobile terminal operating in a GSM-only coverage area provided by a cellular network, in accordance with an embodiment of the invention.

Certain embodiments of the invention may be found in a method and system for a fast cell search using a PSYNC process in a multimode WCDMA terminal. A WCDMA frequency search or a global system for mobile communications (GSM) frequency search is performed based on a current radio access technology (RAT), received signal strength indication (RSSI) scan measurements, and PSYNC detection operations. The RSSI scan measurements may be averaged by making multiple measurements during a measurement period. At least part of the PSYNC detection operations may be performed during a remaining portion of the measurement period. WCDMA carrier frequencies may be marked in accordance with the results of the PSYNC detection operations. For GSM, some of the frequencies may be removed from the search based on the PSYNC marking while the remaining search frequencies may be ranked based on results from the RSSI scan measurements.

For WCDMA-based access technologies, such as UMTS, establishing or selecting coverage by a particular cell and its associated carrier frequency, for example, requires that the mobile terminal obtains a primary scrambling code via a common pilot channel (CPICH) from that cell. When the mobile terminal is unable to detect or clearly receive the CPICH, the result is likely to be failed initiations, poor voice quality, reduced data throughput, and/or dropped calls. The CPICH quality, and therefore the range of the cell's coverage, may be determined in terms of the spread spectrum signal-to-noise ratio, Ec/Io. The CPICH measurements also require that the mobile terminal synchronize with the base station's frame and slot timing through the primary synchronization (PSYNC) channel and the secondary synchronization (SSYNC) channel, respectively. In this regard, each 10 ms radio frame, for example, is divided into 15 slots, each with a length of 2560 chips. The PSYNC channel, for example, consists of a modulated code of length 256 chips transmitted once every slot.

Given the complexity and legacy issues facing cellular networks, advanced mobile terminals may be adapted to support more than one radio access technology. For example, mobile terminals may support both GSM-based and WCDMA-based technologies. When establishing or selecting coverage by a particular cell, multiple-mode mobile terminals may utilize separate frequency search procedures to establish or select coverage by a network cell. In this regard, the WCDMA frequency search procedures may be completely decoupled from the GSM frequency search procedures. The information gathered by the WCDMA frequency search procedure is not used by the GSM frequency search procedure and vice versa. In addition, only when one frequency search procedure is finished can the other frequency search procedure be started.

The decoupling that results from separate frequency search procedures in, for example, a dual-mode mobile terminals supporting both GSM and WCDMA technologies may make the time it takes to complete a frequency search very long. For example, current implementations may take about 50 seconds, too long a time for practical purposes, to conclude that no UMTS cells are available in a GSM-only coverage area. When the mobile terminal is in a GSM-only coverage area, the mobile terminal will try to search on each of the UMTS absolute radio frequency channel number (UARFCN) before it concludes there is no UMTS cell available. Current implementations may perform an integrated PSYNC, SSYNC and CPICH acquisition operation in the search procedure for each UARFCN at a time. The integrated search procedure may unnecessarily prolong the search time under certain conditions. Moreover, the one-frequency-at-a-time approach may incur significant overhead for signaling exchange between a physical layer 1 (L1) control unit in the mobile terminal and the WCDMA baseband processor.

In instances when the mobile terminal operates in mixed GSM/UMTS coverage areas, such as for the 1900 MHz band, it may also take too long for the GSM hardware to synchronize to a UMTS-occupied carrier frequency. When there is a strong UMTS existence, the mobile terminal may attempt to synchronize to each of the 200 kHz potential carriers occupied by a WCDMA band, for example. In this regard, a GSM portion of the mobile terminal that takes 150 ms per 200 kHz synchronization may perform a 3.75 s frequency search on a 5 MHz WCDMA carrier band without being able to synchronize to a potential carrier. Mobile terminals that provide support for multiple advanced radio access technologies (RAT), such as GSM and WCDMA, may require the implementation of frequency search operations that effectively and rapidly identify the appropriate carrier frequencies in areas covered by single or mixed RATs.

FIG. 1A is a diagram illustrating an exemplary multi-RAT mobile terminal operating in a GSM-only coverage area provided by a cellular network, in accordance with an embodiment of the invention. Referring to FIG. 1A, there is shown a portion of a cellular network 100a that may comprise a first cell 104a, a second cell 104b, a third cell 104c, and a mobile terminal 102. The first cell 104a may comprise a base station (BS) 106a and a communication antenna 108a. The second cell 104b may comprise a base station 106b and a communication antenna 108b. The third cell 104c may comprise a base station 106c and a communication antenna 108c.

The base stations 106a, 106b, and 106c may comprise suitable logic, circuitry, and/or code that may enable communication with the mobile terminal 102 via GSM technologies. The base stations 106a, 106b, and 106c may enable processing and/or generation of signals necessary to establish, maintain, and/or terminate communication between a network cell and a mobile terminal. The GSM technologies supported by the base stations may be GSM, GPRS, and/or EDGE technologies, for example. Each of the base stations in the network cells may utilize a corresponding GSM carrier frequency with a 200 kHz bandwidth, for example, to communicate with a mobile terminal in the network.

The communication antennas 108a, 108b, and 108c may comprise suitable logic, circuitry, and/or code that may enable transmission and/or reception of signals to and/or from mobile terminals. The communication antennas 108a, 108b, and 108c may be communicatively coupled to the base stations 106a, 106b, and 106c, respectively. The communication antenna 108a may provide GSM coverage in the area illustrated by the coverage area 110a. Similarly, communication antennas 108b and 108c may provide GSM coverage in the areas illustrated by the coverage areas 110b and 110c, respectively. When the cells 104a, 104b, and 104c are close to each other, there may be an overlap in coverage as illustrated by the overlap in the coverage areas 110a, 110b, and 110c shown in FIG. 1A. In this example, the mobile terminal 102 may be located in a GSM-only coverage area created by the overlap between the coverage areas 110a, 110b, and 110c. In some instances, an overlap in area coverage may result from more or fewer cells than those shown in the exemplary network described in FIG. 1A.

The mobile terminal 102 may comprise suitable logic, circuitry, and/or code that may enable communication over a plurality of radio access technologies (RATs), such as GSM and/or WCDMA technologies. The GSM technologies supported by the mobile terminal 102 may be GSM, GPRS, and/or EDGE technologies, for example. The WCDMA technologies supported by the mobile terminal 102 may be WCDMA, UMTS, and/or HSDPA technologies, for example. The mobile terminal 102 may comprise cellular integrated circuits for receiving, processing, and/or transmitting cellular channels. For example, at least one of the cellular integrated circuits may be adapted to handle GSM, and at least one of the cellular integrated circuits may be adapted to handle WCDMA. The mobile terminal 102 may enable communication via a plurality of uplink and downlink cellular channels, for example. The mobile terminal 102 may enable processing and/or generation of signals necessary to establish and/or maintain communication with network cells that support GSM or WCDMA technologies. The mobile terminal 102 may also enable communication by selecting a carrier frequency associated with a GSM cell or with a WCDMA cell available in the network. In this regard, the mobile terminal 102 may have a default RAT and may have processes that may be implemented for changing or selecting a different RAT.

In operation, the mobile terminal 102 may determine that the cellular coverage provided in the area where the mobile terminal 102 is located may be based on GSM technology and may establish communication with one GSM cell in the network 100a. In instances when more than one GSM cell provides coverage in the area where the mobile terminal 102 is located, the mobile terminal 102 may select one of the cells based on, for example, the strength of the GSM signals that the mobile terminal 102 receives from the GSM cells.

Figure 1B:
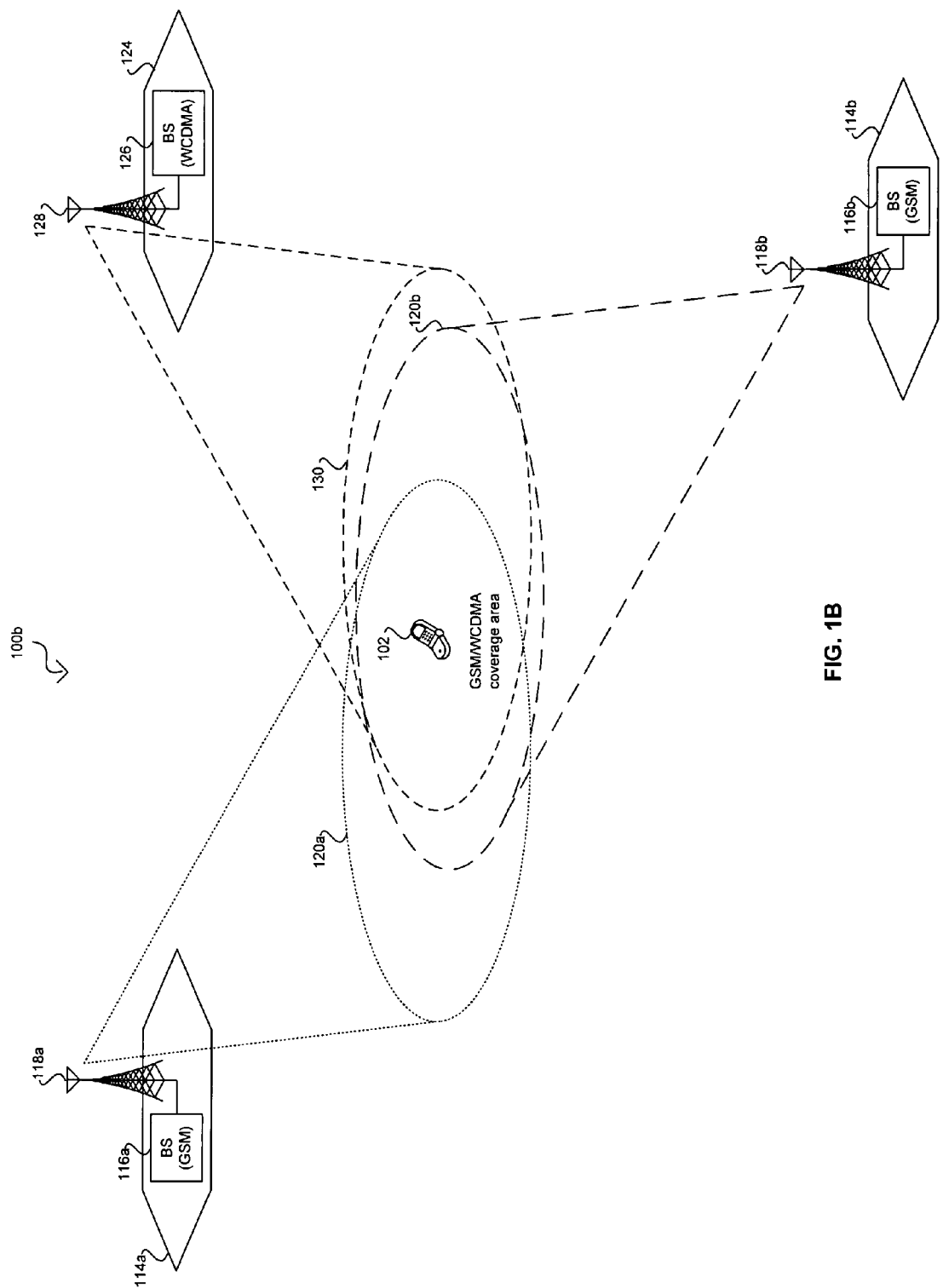
FIG. 1B is a diagram illustrating an exemplary multi-RAT mobile terminal under a GSM/WCDMA coverage area provided by a cellular network, in accordance with an embodiment of the invention.

FIG. 1B is a diagram illustrating an exemplary multi-RAT mobile terminal under a GSM/WCDMA coverage area provided by a cellular network, in accordance with an embodiment of the invention. Referring to FIG. 1B, there is shown a portion of a cellular network 100b that may comprise a first cell 114a, a second cell 124, a third cell 114b, and the mobile terminal 102. The first cell 114a may comprise a base station 116a and a communication antenna 118a. The second cell 114c may comprise a base station 116b and a communication antenna 118b. The third cell 124 may comprise a base station 126 and a communication antenna 128.

The base stations 116a and 116b may comprise suitable logic, circuitry, and/or code that may enable communication with the mobile terminal 102 via GSM technologies. The base stations 116a and 116b may enable processing and/or generation of signals necessary to establish, maintain, and/or terminate communication between a network cell and a mobile terminal. The GSM technologies supported by the base stations 116a and 116b may be GSM, GPRS, and/or EDGE technologies, for example. The base stations 116a and 116b may utilize a corresponding GSM carrier frequency with a 200 kHz bandwidth, for example, to communicate with a mobile terminal in the network.

The base station 126 may comprise suitable logic, circuitry, and/or code that may enable communication with the mobile terminal 102 via WCDMA technologies. The base station 126 may enable processing and/or generation of signals necessary to establish, maintain, and/or terminate communication between a network cell and a mobile terminal. The WCDMA technologies supported by the mobile terminal 102 may be WCDMA, UMTS, and/or HSDPA technologies, for example. The base station 126 may utilize a corresponding UMTS carrier frequency with a 5 MHz bandwidth, for example, to communicate with a mobile terminal in the network. In this regard, the 5 MHz UMTS carrier frequency bandwidth may comprise a plurality of UMTS absolute radio frequency channel numbers (UARFCNs) associated with it.

The communication antennas 118a, 118b, and 128 may comprise suitable logic, circuitry, and/or code that may enable transmission and/or reception of signals to and/or from mobile terminals. The communication antennas 118a, 118b, and 128 may be communicatively coupled to the base stations 116a, 116b, and 126, respectively. The communication antennas 118a and 118b may provide GSM coverage in the areas illustrated by the coverage areas 120a and 120b, respectively. The communication antenna 128 may provide WCDMA coverage in the area illustrated by the coverage area 130.

When the cells 114a, 114b, and 124 are close to each other and operate within the same frequency bandwidth, such as GSM and WCDMA operations at the 1900 MHz band, for example, there may be an overlap in coverage as illustrated by the overlap in the coverage areas 120a, 120b, and 130 shown in FIG. 1B. In this example, the mobile terminal 102 may be located in a GSM/WCDMA coverage area created by the overlap between the coverage areas 120a, 120b, and 130. In some instances, an overlap in area coverage may result from more or fewer cells than those shown in the exemplary network described in FIG. 1B. For example, there may be at least one GSM cell and at least one WCDMA cell with overlapping coverage in the area where the mobile terminal 102 is located.

In operation, the mobile terminal 102 may determine that the cellular coverage provided in the area where the mobile terminal 102 is located may be based on both GSM and WCDMA technology. The mobile terminal may establish communication with either a GSM cell or a WCDMA cell based on the default RAT and on the strength of the signals that the mobile terminal 102 receives from the network cells. For example, when GSM is the default RAT and multiple GSM cells provide coverage in the area where the mobile terminal 102 is located, the mobile terminal 102 may select one of the GSM cells based on signal strength. Similarly, when WCDMA is the default RAT and multiple WCDMA cells provide coverage in the area where the mobile terminal 102 is located, the mobile terminal 102 may select one of the WCDMA cells based on, for example, received signal strength.

Figure 2:
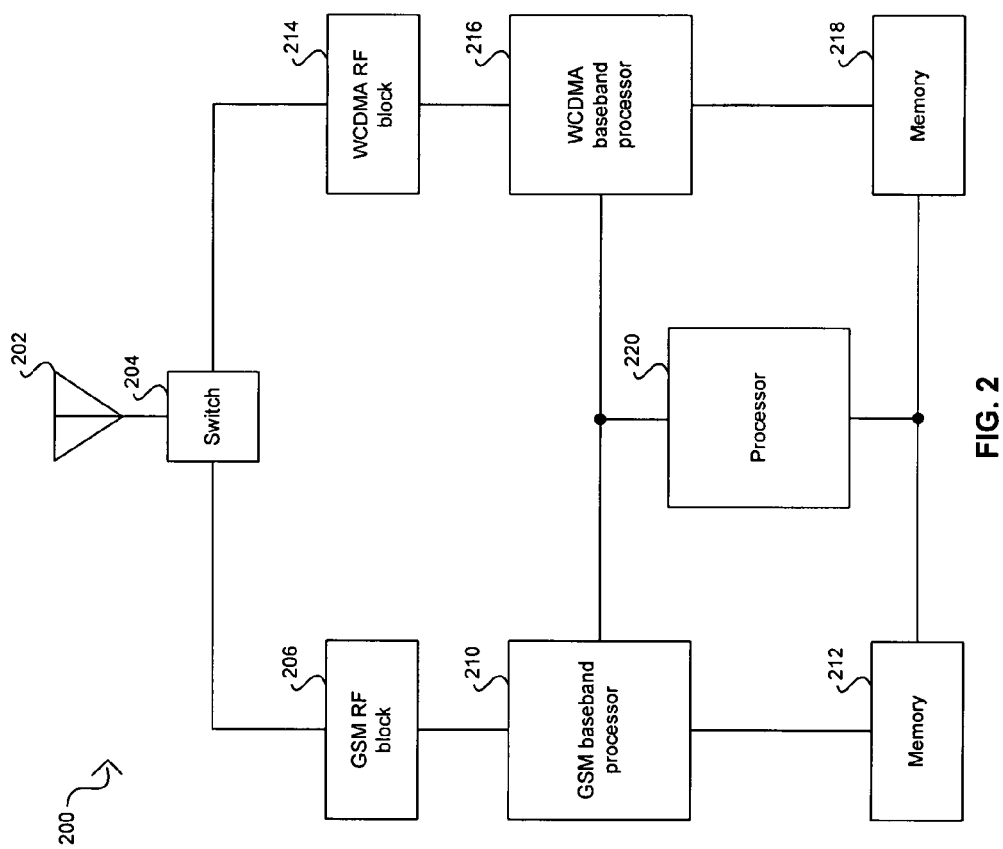
FIG. 2 is a block diagram illustrating an exemplary dual-RAT mobile terminal, in accordance with an embodiment of the invention.

FIG. 2 is a block diagram illustrating an exemplary dual-RAT mobile terminal, in accordance with an embodiment of the invention. Referring to FIG. 2, there is shown a dual-mode RAT mobile terminal 200 that may comprise an antenna 202, a switch 204, a GSM radio frequency (RF) block 206, a GSM baseband processor 210, a first memory 212, a WCDMA RF block 214, a WCDMA baseband processor 216, a second memory 218, and a processor 220.

The antenna 202 may comprise suitable logic and/or circuitry that may enable transmission and/or reception of signals from and/or to the mobile terminal 200. In this regard, the signals may be cellular signals utilized for GSM and/or WCDMA communication. The switch 204 may comprise suitable logic, circuitry, and/or code that may enable selecting between communicating via the antenna 202 using GSM or WCDMA. In this regard, the processor 220 may be utilized to make the selection in the switch 204 in accordance with a current RAT to be utilized by the mobile terminal 200.

The GSM RF block 206 may comprise suitable logic, circuitry, and/or code that may enable processing GSM RF signals received via the antenna 202 and communicating the processed signals to the GSM baseband processor 210. Moreover, the GSM RF block 206 may enable processing signals generated by the GSM baseband processor 210 and communicating the processed signals to the antenna 202 for transmission. The WCDMA RF block 214 may comprise suitable logic, circuitry, and/or code that may enable processing WCDMA RF signals received via the antenna 202 and communicating the processed signals to the WCDMA baseband processor 216. Moreover, the WCDMA RF block 214 may enable processing signals generated by the WCDMA baseband processor 216 and communicating the processed signals to the antenna 202 for transmission.

The WCDMA baseband processor 216 may comprise suitable logic, circuitry, and/or code that may enable processing of WCDMA signals, such as UMTS signals, for example. The WCDMA baseband processor 216 may also enable receiving and/or transmitting WCDMA signals via the WCDMA RF block 214. The WCDMA baseband processor 216 may enable performing received signal strength indication (RSSI) scan measurements in signals associated with both GSM and WCDMA carrier frequencies. Moreover, the WCDMA baseband processor 216 may enable primary synchronization (PSYNC) detection operations on the WCDMA carrier frequencies. In this regard, in one embodiment of the invention, the WCDMA baseband processor 216 need not integrate the PSYNC detection operations with the secondary synchronization (SSYNC) and with the common pilot channel (CPICH) operations when performing the RSSI scan measurements.

The WCDMA baseband processor 216 may enable marking each of the scanned carrier frequencies based on the results from the PSYNC detection operations. Moreover, the WCDMA baseband processor 216 may enable averaging the RSSI scan measurements over a measurement period. In this regard, at least a portion of the PSYNC detection operations may also be performed during the measurement period. The WCDMA baseband processor 216 may enable per frequency search based on results from the RSSI scan measurements and/or the PSYNC detection operations in order to select and establish communication with a WCDMA cell in the network. The WCDMA baseband processor 216 may enable storing the results from the RSSI scan measurements and/or the PSYNC detection operations in the second memory 218. The results from the RSSI scan measurements and/or the PSYNC detection operations may be communicated to the GSM baseband processor 210 via the processor 220 and/or via the second memory 216.

The GSM baseband processor 210 may comprise suitable logic, circuitry, and/or code that may enable processing of GSM signals. The GSM baseband processor 210 may also enable receiving and/or transmitting GSM signals via the GSM RF block 206. The GSM baseband processor 210 may enable ranking GSM frequency carriers based on the results from the RSSI scan measurements and/or the PSYNC detection operations performed by the WCDMA baseband processor 216. For example, when GSM and WCDMA coexist, such as in the 1900 MHz band, for example, carrier frequencies that have been marked as indicating the presence of a WCDMA signal may be removed from the frequency ranking operation. The GSM baseband processor 210 may enable storing the results from ranking in the first memory 212. The GSM baseband processor 210 may enable per frequency synchronization based on results from the ranking operation in order to select and establish communication with a GSM cell in the network.

The processor 220 may comprise suitable logic, circuitry, and/or code that may enable controlling at least a portion of the operations in the mobile terminal 200. The processor 200 may also enable processing at least a portion of the signals and/or data generated by the GSM baseband processor 210 and/or the WCDMA baseband processor 216. In this regard, the processor 220 may communicate with the first memory 212 and/or the second memory 218 in order to obtain stored information generated and/or processed by the GSM baseband processor 210 and/or the WCDMA baseband processor 216.

The processor 220 may also enable changing a current RAT being utilized by the mobile terminal 200 from a default RAT to a different RAT that is also supported by the mobile terminal 200. For example, when the default RAT is GSM and the mobile terminal 200 does not detect coverage by a GSM cell in order to establish network communication, the processor 220 may change the current RAT from a current default value to WCDMA in order to enable the mobile terminal 200 to search for coverage or service provided by a WCDMA cell in the same area.

Figure 3A:
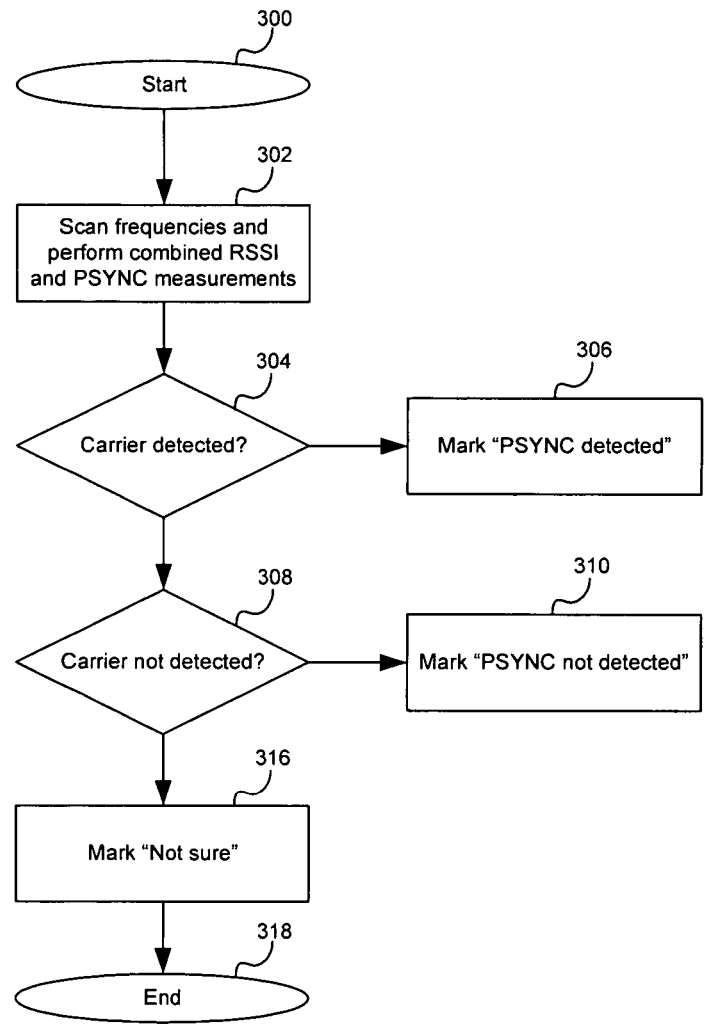
FIG. 3A is a flow diagram illustrating exemplary steps in marking carrier frequencies during combined RSSI and PSYNC operations, in accordance with an embodiment of the invention.

FIG. 3A is a flow diagram illustrating exemplary steps in marking carrier frequencies during combined RSSI and PSYNC operations, in accordance with an embodiment of the invention. Referring to FIG. 3A, after start step 300, in step 302, the WCDMA baseband processor 216 in FIG. 2 may perform combined RSSI scan measurements on both GSM and WCDMA carrier frequencies. The WCDMA baseband processor 216 may also perform PSYNC detection operations on each of the WCDMA carrier frequencies. In one embodiment of the invention, the PSYNC detection operations need not be integrated with SSYNC and CPICH operations. The RSSI scan measurements and at least a portion of the PSYNC detection operations may be performed by the WCDMA baseband processor 216 during a specified measurement period.

In step 304, when the WCDMA baseband processor 216 detects the PSYNC of a WCDMA carrier frequency, the process may proceed to step 306 where the WCDMA baseband processor 216 may mark the corresponding carrier frequency to indicate that the PSYNC channel has been detected. Otherwise, the process may proceed to step 308. In step 308, when the WCDMA baseband processor 216 does not detect the PSYNC of the WCDMA carrier frequency, the process may proceed to step 310 where the WCDMA baseband processor 216 may mark the corresponding carrier frequency to indicate that the PSYNC channel has not been detected. Otherwise, the process may proceed to step 316 where the WCDMA baseband processor 216 may mark the corresponding carrier frequency to indicate that it is not sure whether the PSYNC channel is present or not. This approach may be followed for the WCDMA carrier frequencies in a specified frequency band, such as the 1900 MHz band, for example. After step 316, the process may proceed to end step 318.

Figure 3B:
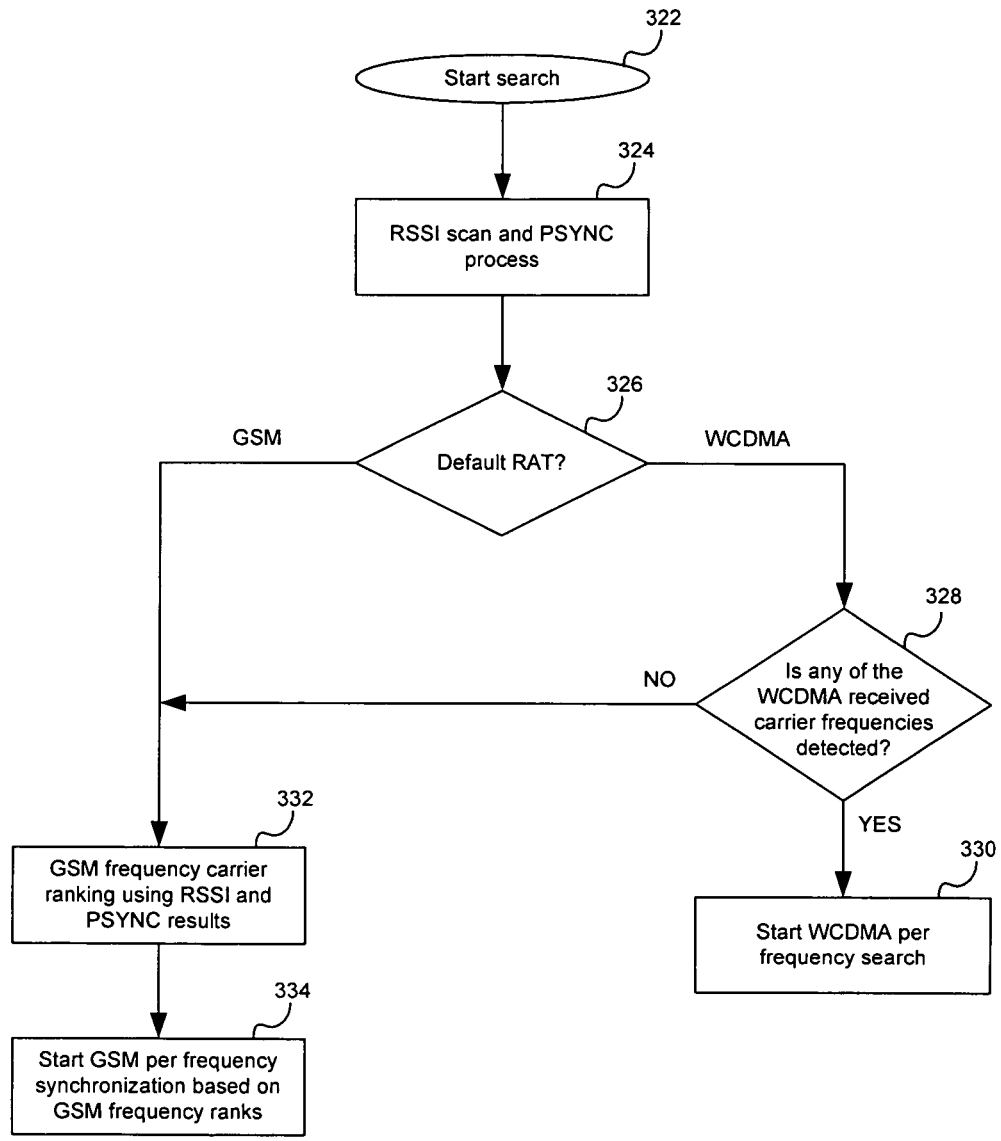
FIG. 3B is a flow diagram illustrating exemplary steps in performing frequency searches based on a default RAT and results from the combined RSSI and PSYNC operations, in accordance with an embodiment of the invention.

FIG. 3B is a flow diagram illustrating exemplary steps in performing frequency searches based on a default RAT and results from the combined RSSI and PSYNC operations, in accordance with an embodiment of the invention. Referring to FIG. 3B, in start search step 322, the WCDMA baseband processor 216 in FIG. 2 may initiate the frequency search operations in order to establish communication with a cell that provides coverage in the area where the mobile terminal is located. In step 324, the WCDMA baseband processor 216 may perform combined RSSI scan measurements on both GSM and WCDMA carrier frequencies as described in step 302 in FIG. 3A. Moreover, the WCDMA baseband processor 216 may mark the WCDMA carrier frequencies as described in step 304 through step 316 in FIG. 3A.

In step 326, the mobile terminal may determine whether a GSM frequency search or a WCDMA frequency search is to be performed based on the default RAT. When the default RAT is WCDMA, the process may proceed to step 328. In step 328, the WCDMA baseband processor 216 may determine whether at least one of the WCDMA frequency carriers was detected in step 324. When at least one WCDMA carrier frequency in step 324 was marked as PSYNC channel detected or not sure, the process may proceed to step 330. In step 330, the WCDMA baseband processor 216 may perform per frequency search in the WCDMA carrier frequencies not marked as PSYNC channel not detected. In this regard, the WCDMA baseband processor 216 may perform an integrated PSYNC, SSYNC, and CPICH operation in order to establish communication with one of the WCDMA network cells providing coverage in the area where the mobile terminal is located. For example, in UMTS applications, for each of the 5 MHz bands being searched, the WCDMA baseband processor 216 may search through each of the UMTS absolute radio frequency channel numbers (UARFCNs) associated with it. Returning to step 328, when all WCDMA carrier frequencies in step 324 are marked as PSYNC channel not detected, that is, none of the WCDMA carrier frequencies were detected in step 324, the process may proceed to step 332.

Returning to step 326, when the default RAT in the mobile terminal is GSM, the process may proceed to step 332. In step 332, the GSM baseband processor 210 may rank the GSM carrier frequencies based on the RSSI scan measurements and the PSYNC detection operation results. For example, the RSSI scan measurements may be utilized to rank the GSM carrier frequencies in order of signal strength or SNR. In this regard, the GSM carrier frequency with the highest SNR may have the highest ranking while the GSM carrier frequency with the lowest SNR may have the lowest ranking, for example. In addition to creating a ranked list of the GSM carrier frequencies based on the RSSI scan measurements, the PSYNC detection operation results may be utilized to remove from the ranked list of GSM carrier frequencies those frequencies that may be comprised within WCDMA carrier frequencies marked as PSYNC channel detected by the WCDMA baseband processor 216. For example, in UMTS applications, a WCDMA carrier frequency marked as PSYNC channel detect may result in up to 25 GSM carrier frequencies being removed from the ranked list. When step 332 results from step 328, there may not be any WCDMA carrier frequencies marked PSYNC channel detected and the ranking operation may be based on the RSSI scan measurements. In step 334, the GSM baseband processor 210 may perform per frequency synchronization based on the GSM carrier frequencies ranked in step 332 in order to establish communication with one of the GSM network cells providing coverage in the area where the mobile terminal is located.

Figure 3C:
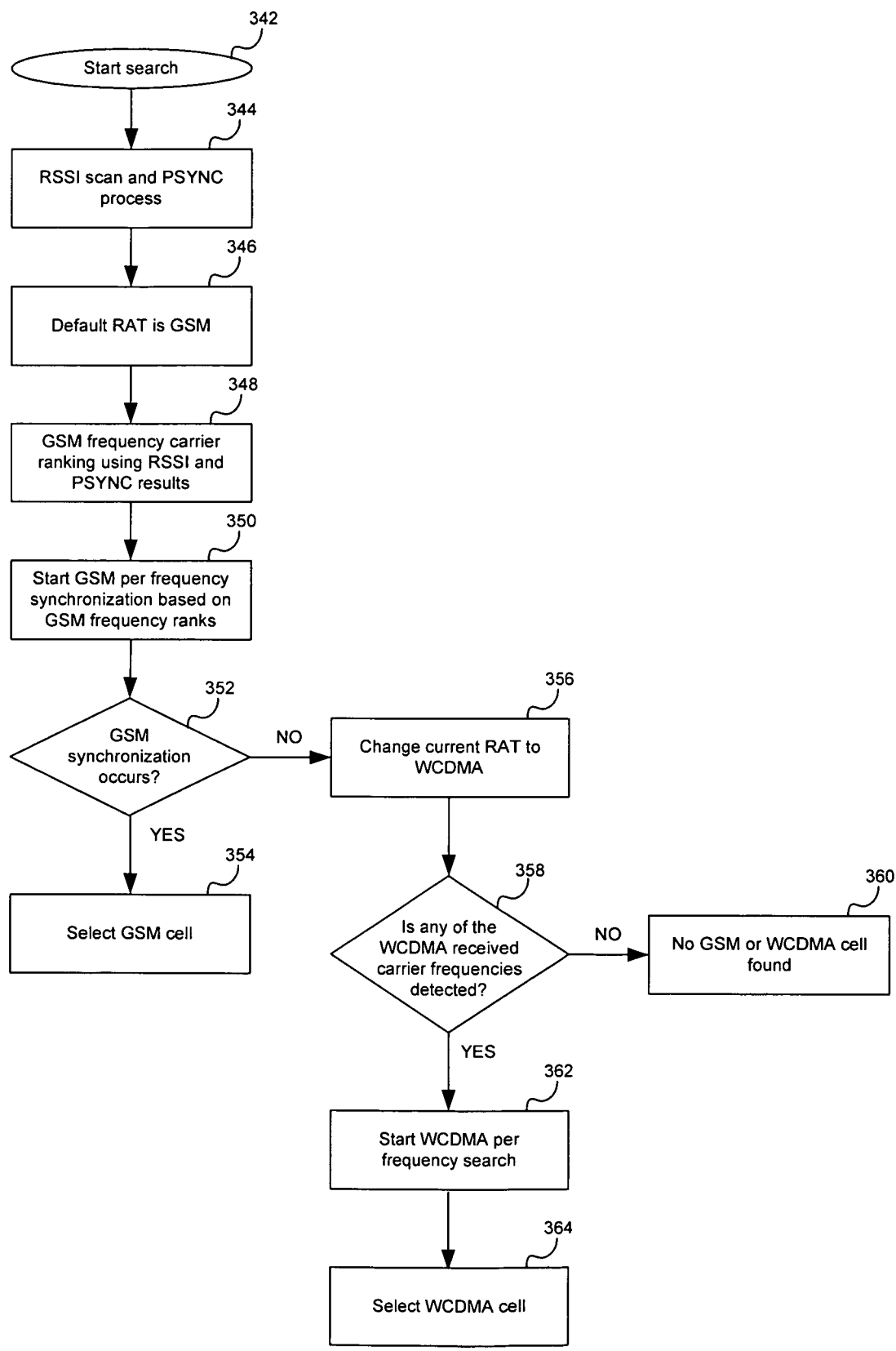
FIG. 3C is a flow diagram illustrating exemplary steps in performing frequency searches when the default RAT is GSM, in accordance with an embodiment of the invention.

FIG. 3C is a flow diagram illustrating exemplary steps in performing frequency searches when the default RAT is GSM, in accordance with an embodiment of the invention. Referring to FIG. 3C, in start search step 342, the WCDMA baseband processor 216 in FIG. 2 may initiate the frequency search operations in order to establish communication with a cell that provides coverage in the area where the mobile terminal is located. In step 344, the WCDMA baseband processor 216 may perform combined RSSI scan measurements on both GSM and WCDMA carrier frequencies as described in step 302 in FIG. 3A. Moreover, the WCDMA baseband processor 216 may mark the WCDMA carrier frequencies as described in step 304 through step 316 in FIG. 3A. In step 346, because the default RAT is GSM, the mobile terminal may first try to establish communication with a GSM network cell providing coverage in the area where the mobile terminal is located. In step 348, the GSM baseband processor 210 may rank the GSM carrier frequencies based on the RSSI scan measurements and the PSYNC detection operation results as described in step 332 in FIG. 3B. In step 350, the GSM baseband processor 210 may perform per frequency synchronization based on the GSM carrier frequencies ranked in step 348, in order to establish communication with one of the GSM network cells providing coverage in the area where the mobile terminal is located.

In step 352, when the GSM baseband processor 210 is able to synchronize to a GSM carrier frequency, the process may proceed to step 354 where the mobile terminal establishes communication with the GSM cell that corresponds to the synchronized carrier frequency. When the GSM baseband processor 210 is unable in step 350 to synchronize to a GSM carrier frequency, the process may proceed to step 356. In step 356, the processor 220 in FIG. 2, for example, may enable changing the current RAT from a current default RAT, that is, GSM, to WCDMA. After step 356, the process may proceed to step 358.

In step 358, the WCDMA baseband processor 216 may determine whether at least one of the WCDMA frequency carriers was detected in step 344. When at least one WCDMA carrier frequency in step 344 was marked as PSYNC channel detected or not sure, the process may proceed to step 362. In step 362, the WCDMA baseband processor 216 may perform per frequency search in the WCDMA carrier frequencies not marked as PSYNC channel not detected. In this regard, the WCDMA baseband processor 216 may perform an integrated PSYNC, SSYNC, and CPICH operation in order to establish communication with one of the WCDMA network cells providing coverage in the area where the mobile terminal is located. For example, in UMTS applications, for each of the 5 MHz bands being searched, the WCDMA baseband processor 216 may search through each of the UMTS absolute radio frequency channel numbers (UARFCNs) associated with it. In step 364, when the WCDMA baseband processor 216 is able to find a WCDMA carrier frequency the mobile terminal establishes communication with the WCDMA cell that corresponds to the WCDMA carrier frequency found.

Returning to step 358, when all WCDMA carrier frequencies in step 344 are marked as PSYNC channel not detected, that is, none of the WCDMA carrier frequencies were detected in step 344, the process may proceed to step 360 where the mobile terminal determines that neither a GSM cell nor a WCDMA cell has been found at this time to provide the appropriate coverage for the area where the mobile terminal is located.

Figure 4:
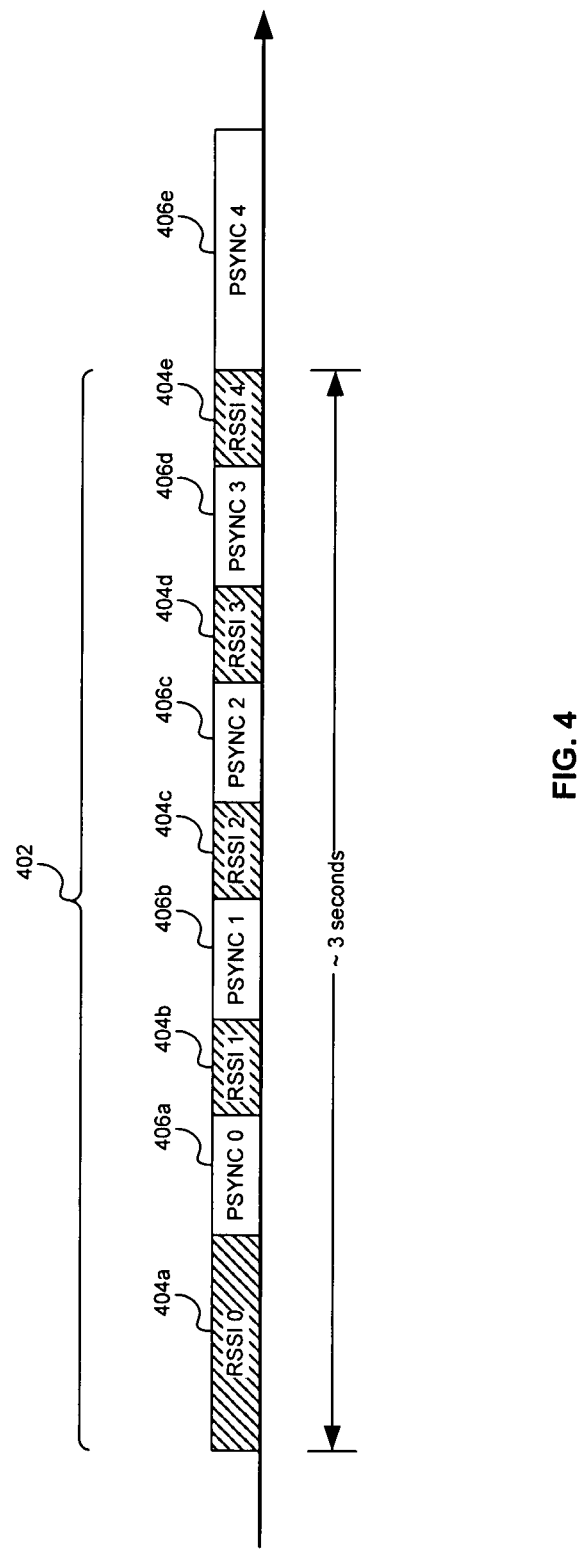
FIG. 4 is a diagram illustrating exemplary collection of multiple RSSI samples during a measurement period, in accordance with an embodiment of the invention.

FIG. 4 is a diagram illustrating exemplary collection of multiple RSSI samples during a measurement period, in accordance with an embodiment of the invention. Referring to FIG. 4, there is shown a measurement period 402 that corresponds to a time interval utilized by the mobile terminal to perform RSSI scan measurements and at least a portion of the PSYNC detection operations. The measurement period 402 may be about 3 seconds, for example. In order to obtain an average RSSI measurement, a plurality of RSSI scan measurements or samples may be performed for each 200 kHz band of RF channels. In this example, five RSSI measurements or samples intervals 404a, 404b, 404c, 404d, and 404e labeled RSSI 0, RSSI 1, RSSI 2, RSSI 3, and RSSI 4 respectively, are performed within the measurement period 402. The first RSSI scan interval, RSSI 0, may take longer since there is a need to obtain a reliable WCDMA RSSI scan result to facilitate determination of which UARFCN to perform PSYNC detection subsequently.

For the 1900 MHz band, for example, it may take approximately 1.5 seconds of the measurement period to perform five RSSI scan measurements. Since GSM and WCDMA are on the same frequency band, the RSSI scan measurements may be shared between the two RATs so that no extra time needs to be allocated for a WCDMA-only RSSI scan measurement, for example. The remaining unused time in the measurement period 402 may be utilized for WCDMA PSYNC detection operations. In the example illustrated in FIG. 4, there are four intervals 406a, 404b, 404c, and 406d labeled PSYNC 0, PSYNC 1, PSYNC 2, and PSYNC 3 respectively, where PSYNC detection operation may be performed within the measurement period 402. In some instances, even after the completion of the measurement period 402, when all RSSI scan measurements are ready, there may still be at least some WCDMA carrier frequencies remaining for performing PSYNC detection. The PSYNC detection operation may continue past the completion of the measurement period 402, as illustrated by the interval 406e labeled PSYNC 4, until enough PSYNC results have been collected. In some instances PSYNC detection operations may take additional time when performed more than once on each UARFN in order to obtain more reliability and time diversity. However, parallelizing PSYNC detection operations on multiple adjacent UARFCNs with +/−200 kHz offset may reduce, in half, the time it takes to complete the PSYNC detection operations.

The approach described above enables mobile terminals to provide support for multiple advanced radio access technologies (RAT), such as GSM and WCDMA, in a manner that effectively and rapidly identifies the appropriate carrier frequencies in areas covered by single or mixed RATs.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing received signals in a wireless device, the method comprising:
   selecting a network cell for a current radio access technology (RAT) based on one of: a first RAT per frequency synchronization and wideband code division multiple access (WCDMA) per frequency searching, and on: received signal strength indication (RSSI) scan measurements for said first RAT and for WCDMA received carrier frequencies, and primary synchronization code (PSYNC) detection on said WCDMA received carrier frequencies;
   marking each of said WCDMA received carrier frequencies based on results from said PSYNC detection; and
   ranking at least a portion of said first RAT received carrier frequencies before said first RAT per frequency synchronization based on results from said RSSI scan measurements and said PSYNC detection.

2. The method according to claim 1, wherein said first RAT is global system for mobile communications (GSM).

3. The method according to claim 1, comprising performing said WCDMA per frequency search when said current RAT is WCDMA.

4. The method according to claim 1, comprising performing said first RAT per frequency synchronization when said current RAT is said first RAT.

5. The method according to claim 1, comprising if a WCDMA received carrier frequency is undetected by said PSYNC detection, performing said first RAT per frequency synchronization when said current RAT is WCDMA.

6. The method according to claim 1, comprising averaging said RSSI scan measurements captured during a portion of a measurement period.

7. The method according to claim 6, comprising performing at least a portion of said PSYNC detection during a remaining portion of said measurement period.

8. A non-transitory machine-readable storage having stored thereon, a computer program having at least one code section for processing received signals in a wireless device, the at least one code section being executable by a machine for causing the machine to perform steps comprising selecting a network cell for a current radio access technology (RAT) based on one of: a first RAT per frequency synchronization and wideband code division multiple access (WCDMA) per frequency searching, and on: received signal strength indication (RSSI) scan measurements for said first RAT and for WCDMA received carrier frequencies, and primary synchronization code (PSYNC) detection on said WCDMA received carrier frequencies;
   marking each of said WCDMA received carrier frequencies based on results from said PSYNC detection; and
   ranking at least a portion of said first RAT received carrier frequencies before said first RAT per frequency synchronization based on results from said RSSI scan measurements and said PSYNC detection.

9. The non-transitory machine-readable storage according to claim 8, wherein said first RAT is global system for mobile communications (GSM).

10. The non-transitory machine-readable storage according to claim 8, the at least one code section comprising code for performing said WCDMA per frequency search when said current RAT is WCDMA.

11. The non-transitory machine-readable storage according to claim 8, the at least one code section comprising code for performing said first RAT per frequency synchronization when said current RAT is said first RAT.

12. The non-transitory machine-readable storage according to claim 8, wherein if a WCDMA received carrier frequency is undetected by said PSYNC detection, said first RAT per frequency synchronization is performed when said current RAT is WCDMA.

13. The non-transitory machine-readable storage according to claim 8, comprising code for averaging said RSSI scan measurements captured during a portion of a measurement period.

14. The non-transitory machine-readable storage according to claim 13, comprising code for performing at least a portion of said PSYNC detection during a remaining portion of said measurement period.

15. A system for processing received signals in a wireless device, the system comprising:
- a baseband processor that enables received signal strength indication (RSSI) scan measurements for a first radio access technology (RAT) and wideband code division multiple access (WCDMA) received carrier frequencies, and primary synchronization code (PSYNC) detection on said WCDMA received carrier frequencies;
- wherein said baseband processor enables at least one processor to select a network cell for a current RAT based on one of: WCDMA per frequency searching and said first RAT per frequency synchronization, and on said RSSI scan measurements and said PSYNC detection;
- wherein said baseband processor enables at least one processor to mark each of said WCDMA received carrier frequencies based on results from said PSYNC detection; and
- wherein said baseband processor enables ranking at least a portion of said first RAT received carrier frequencies before said first RAT per frequency synchronization based on results from said RSSI scan measurements and said PSYNC detection.

16. The system according to claim 15, wherein said first RAT is global system for mobile communications (GSM).

17. The system according to claim 15, wherein said baseband processor enables performing said WCDMA per frequency search when said current RAT is WCDMA.

18. The system according to claim 15, wherein said baseband processor enables said at least one processor to perform said first RAT per frequency synchronization when said current RAT is said first RAT.

19. The system according to claim 15, wherein if a WCDMA received carrier frequency is undetected by said PSYNC detection, said baseband processor enables said at least one processor to perform said first RAT per frequency synchronization when said current RAT is WCDMA.

20. The system according to claim 15, wherein said baseband processor enables averaging said RSSI scan measurements captured during a portion of a measurement period.

21. The system according to claim 20, wherein said baseband processor enables performing at least a portion of said PSYNC detection during a remaining portion of said measurement period.

* * * * *